United States Patent
Smart et al.

(10) Patent No.: US 6,496,885 B1
(45) Date of Patent: Dec. 17, 2002

(54) METHOD FOR PROCESSING NETWORK MESSAGES

(75) Inventors: David Charles Smart, Waterloo; Jerry Norman Kitchen, Cedar Falls; Jeremy T. Yoder, Cedar Rapids, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/354,345

(22) Filed: Jul. 14, 1999

(51) Int. Cl.$^7$ .............................................. G06F 13/00

(52) U.S. Cl. ........................................ 710/100; 710/52

(58) Field of Search ..................... 710/52, 100; 455/39, 455/73; 370/389, 390, 432; 709/206, 207; 714/4; 375/146, 147; 379/1.02, 1.03, 67.1; 701/50; 702/142; 180/170

(56) References Cited

U.S. PATENT DOCUMENTS 4,412,285 A * 10/1983 Neches et al.
5,237,571 A * 8/1993 Cotton et al.
6,038,309 A * 3/2000 Ram et al.

OTHER PUBLICATIONS

The C Programming Language, pp. 134–136, published 1978.

* cited by examiner

Primary Examiner—Gopal C. Ray

(57) ABSTRACT

A network includes a plurality of electronic control units (ECU) connected with each other and receiving messages via a bus, each message having an identifier portion and a data portion. An ECU processes messages by converting the message identifier to a hash value, comparing the hash value to a plurality of index values stored in a lookup table, the lookup table having relevance values corresponding to each index value, discarding the message if a corresponding relevance value indicates that the message is not relevant to the ECU, inserting the message into memory buffer if a corresponding relevance value indicates that the message is relevant to the ECU, and further processing only selected ones of the messages in the buffer. Preferably, the hash value has fewer data bits than that of the identifier portion of the messages, and the number of unique hash values is the same as a number of index values. The number, N, of index values for the lookup table is determined by selecting from a plurality of potential values for N, a particular N value which minimizes a number of non-relevant messages received by the ECU.

8 Claims, 4 Drawing Sheets

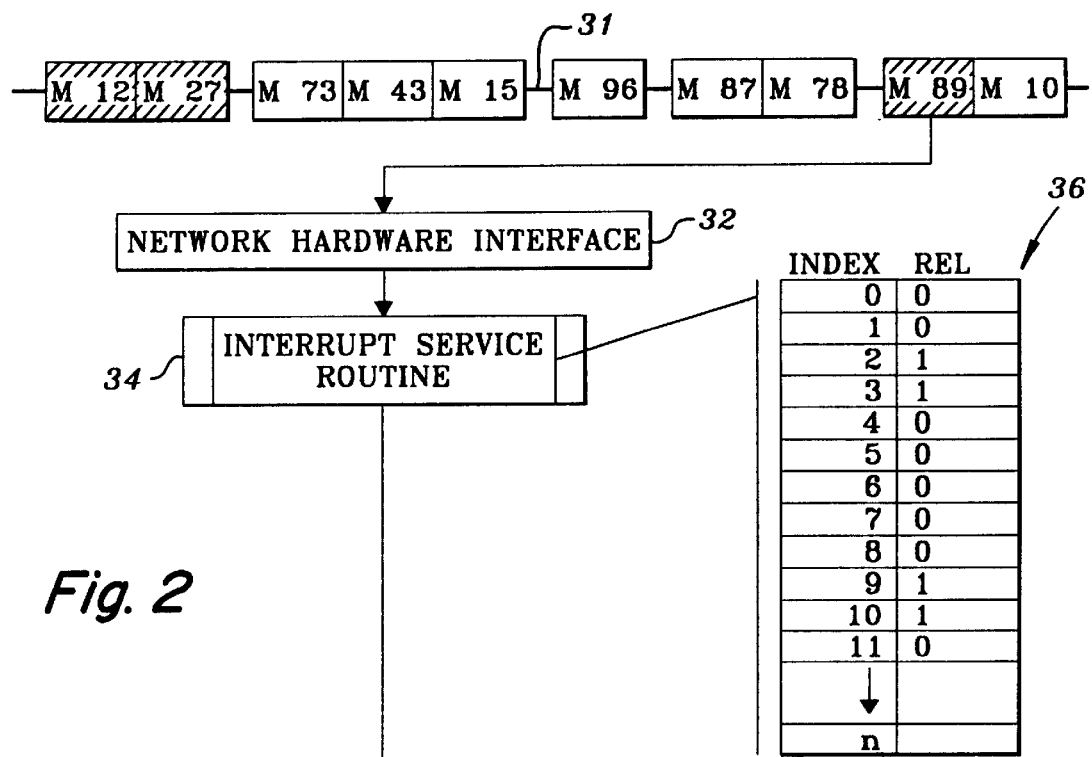
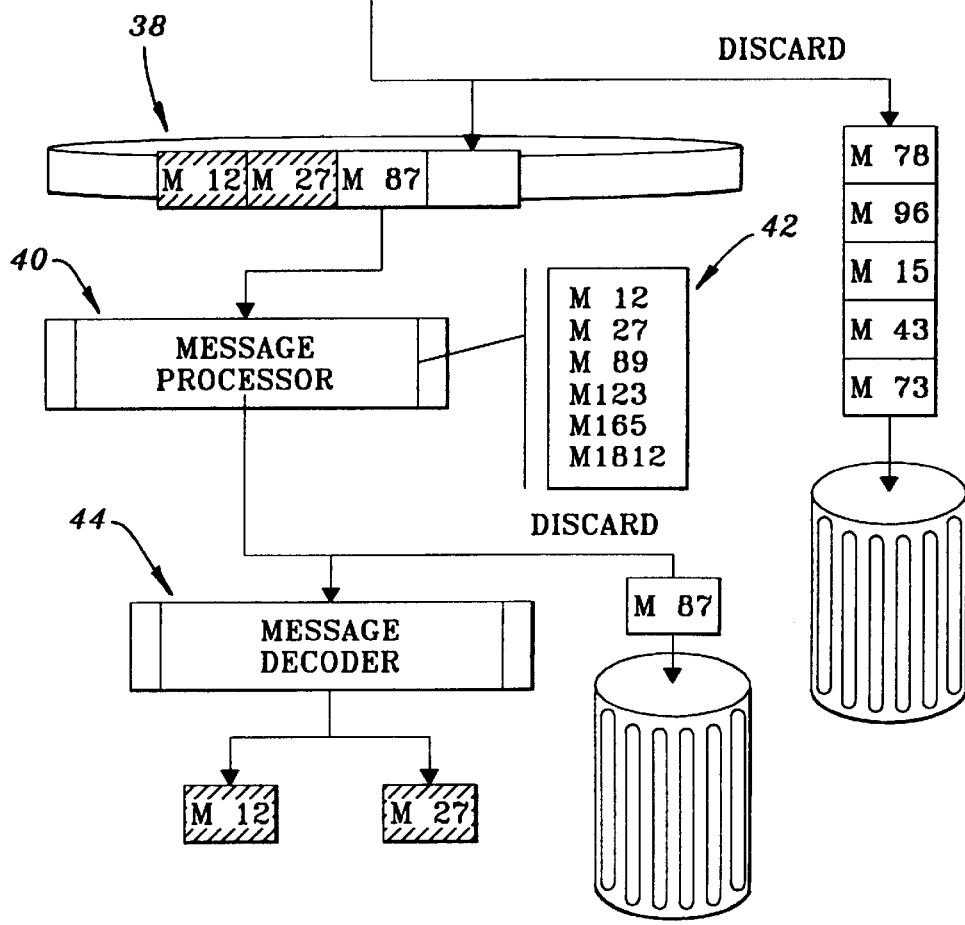
Fig. 2

METHOD FOR PROCESSING NETWORK MESSAGES

BACKGROUND OF THE INVENTION

The invention relates to a method for processing network messages.

Modern utility or agricultural vehicles typically include a network of electronic control units (ECUs), such as an engine controller ECU, a transmission controller ECU, a dashboard instrumentation ECU, etc. The network may circumnavigate the vehicle to allow the various ECU's to be located in proximity to the subsystem with which they are associated. A multitude of data messages are routinely broadcast on the network, of which each individual message may have relevance to only a few of the ECUs. For example, the engine controller ECU may provide engine speed information to the display ECU, but an ECU operating the vehicle lighting system will have no need for the engine speed information. Each ECU typically includes a chip set which includes a microprocessor (CPU) and CAN (Controller Area Network) networking hardware.

There exists applicable network protocol standards (SAE-J1939 and ISO-11783) which govern the communication of messages in such a network. Under the J1939 standard, messages include message identifiers. Message identifiers are the concatenation of several fields, including: (i) Priority—3 bits; (ii) Parameter Group Number (PGN)—16 bits; (iii) Destination Address (DA)—8 bits; (iv) Source Address (SA)—8 bits; and (v) Other—2 bits. So, these fields combine into a 29 bit message identifier.

The Priority field enables high priority messages to have preferred network access over lower priority. The PGN field is used to identify groups of parameters for more efficient network transport. An example is the grouping of engine speed and engine torque into one network message. Another group may have turn signal switches and other "courtesy" type signals. Each group is assigned a number. Also, there are some values of PGN where the purpose is to allow direct communication from one ECU to another. In this case, part of the PGN is the destination address. The Destination Address field (DA) contains the unique address number assigned to every ECU on the network. Since every ECU has a unique number, one ECU can communicate directly to another ECU using a particular range of the PGN's that are assigned to this purpose. The Source Address field (SA) is used for the unique number which is assigned to every ECU, so that the originating ECU of every message on the network can be identified. The "Other" fields are reserved for future use.

In many instances, a message under the J1939 protocol will have pre-defined PGN's (Parameter Group Numbers) corresponding to common parameters like engine speed, oil pressure, turn signal switches, etc. Many new ECU's have parameters which are not pre-defined. J1939 also allows for "proprietary messaging", wherein, for certain values of the PGN, the specifics of what data is carried in that PGN is left to the developers and will not appear in the J1939 standard. When new systems are created, it is common to prototype the system using these proprietary messages. If there is a need to put new parameters on the network, for example, "radio antenna height", a corresponding pre-defined PGN would not be found in the current J1939 database. So the system would be prototyped by using the proprietary messages to communicate the parameter "radio antenna height". Eventually, a PGN may be defined for such a parameter, but this involves a long lead time of many months to over a year.

In order to support these protocols, an extensive set of network messages must be supported. Each message that is received by an ECU microprocessor must have its message identifier examined to determine if this message is relevant to that particular ECU. For ECUs dealing with a small set of messages, the commonly available CAN networking hardware has built-in filtering which can perform this test, thereby automatically accepting messages of interest and rejecting other messages, without intervention of the ECU microprocessor. However, a typical ECU on such a network must process a much larger set of messages than the built-in hardware filters can manage, and therefore the acceptance and rejection of messages must be done in system software.

On a complex new system, there may be tens or even hundreds of new parameters. In such a system, these parameters are located in the "proprietary message" PGN's. But this group of PGN's may not have the capacity for all of the new parameters. Therefore, it is a relatively common practice to use one data byte in the proprietary message to further describe the purpose of the specific message. Using one data byte provides 8 bits and therefore 256 additional unique combinations which allow association of particular parameters with corresponding PGNs.

When the message acceptance and rejection function is performed by system software, the CPU load is greatly increased, potentially to the extent that lower priority non-network related activity is at risk of not being performed in a timely manner. In order to overcome this problem, much more powerful CPU's or other additional electronic hardware may be required. Either of these requirements would increase the system cost significantly.

Message identifiers are 29 bits long, and for some instances of message identifiers, examination of one or more of the data bytes may be required in order to determine relevancy of the message to a given ECU. Using conventional lookup table methods are not practical since the table may require more than $2^{29th}$ entries and if one of, the data bytes is further required to determine the relevancy of a given message, then $2^{37th}$ entries would be required. Also, message identifiers that are relevant to a particular ECU do not map into an addressing space with enough repetition such that an efficient mathematical formula could be used.

It is believed that typical current production networks implement a two step process, detecting and offloading messages as a high priority process and then processing messages as a low priority process. This process is time consuming to perform when many messages in the system have no relevance to a particular ECU or node. For example, an interrupt service routine (ISR) responding to a new message queues the message for later examination. If this message is not relevant, then this processing time is wasted, and conventional methods of determining message relevance require too much time in the ISR. Another example of wasted processing time is a lower priority process which periodically removes messages from the queue and compares them against the list of desired messages whether the messages are relevant or not.

In detail, the typical procedure for processing a CAN network message is as follows:

A network message arrives in the CAN subsystem of the ECU. This alerts the CPU via an interrupt. Normal processing is suspended and the ISR takes over to extract the message from the CAN subsystem, and move the message into a queue for later processing. This software is often very tightly designed to minimize the impact on other activities in the system and it is not obvious how to filter the messages in this ISR without adding extensive resources to the system. The CPU returns control to the previously active process. At a more convenient point in time, the CPU examines the queue for any messages that may be present. If one or more messages are present, they are individually examined to determine their relevance to this ECU in the network. This examination is typically done by comparing the unique identifier for this message against a list of known identifiers representing relevant messages. If the new message matches a message of interest, then the message is processed by this system. If the new message does not match, after having exhaustively compared the message identifier against all known identifiers of interest, then this message is rejected. The process repeats until some limit is reached. This limit may be an empty queue, some period of time, or some number of messages. The CPU performs other duties, and at some point in time in the future repeats this process.

With such a typical system, the ISR does a fixed amount of work requiring approximately 60 microseconds of CPU time. The message processor, scans the list of valued messages, requiring approximately 100 microseconds of CPU time to exhaustively search the list. Due to the large range of values for the message identifiers, there are not readily identifiable optimizations that can speed up the search, so it is typically a linear search. As the length of the list is increased, the time to scan the list is increased proportionally. If a message is found in the list, the message is then decoded. A typical ECU may find less than 20% of the messages to be relevant to it. For each message with no relevance, the CPU expends approximately 160 microseconds.

It would be desirable to provide a faster method for processing and determining relevance of network messages which is usable with less expensive CPU's, which rejects messages with no relevance, and which can function during conditions of heavy network message loading.

SUMMARY OF THE INVENTION

Accordingly, an object of this invention is to provide a method for processing and determining relevance of network messages which is usable with less expensive CPU's.

A further object of the invention is to provide such a method for processing and determining relevance of network messages which rejects messages with no relevance.

Another object of the invention is to provide a method for processing and determining relevance of network messages which can function during conditions of heavy network message loading.

These and other objects are achieved by the present invention, which performs a rapid mathematical hashing of the unique message identifier (which is up to 29 bits in length) of messages communicated over a network. This hashing function returns a small hash value, which is compared to index values in a relatively small lookup table which contains a relevance value for each index value. The table returns a 1 (or non-zero) for index values corresponding to relevant messages and a 0 for irrelevant messages. Relevant messages are accepted and queued into a RAM buffer. Irrelevant messages are rejected. This implementation is efficient and fast enough to be performed as part of an interrupt service routine ISR. Careful selection of the hashing function and table size produces a system that does not require additional filtering hardware. If the message is not relevant, then it is not queued and the ISR is complete, saving significant time in the ISR itself. Only those messages that pass through the above ISR "filtering" are stored in a queue and eventually compared against a list of desired messages. If the message was rejected by the ISR, then no time is consumed for that message in this second stage of the process. When compared to the typical linear or binary search algorithm which could be used in the second stage of operation, this method saves a significant amount of CPU processing time for other processing needs.

BRIEF DESCRIPTION OF THE DRAWINGS

FIG. 2 is a schematic diagram illustrating the operation of the present invention;

DESCRIPTION OF THE PREFERRED EMBODIMENT

Figure 1:
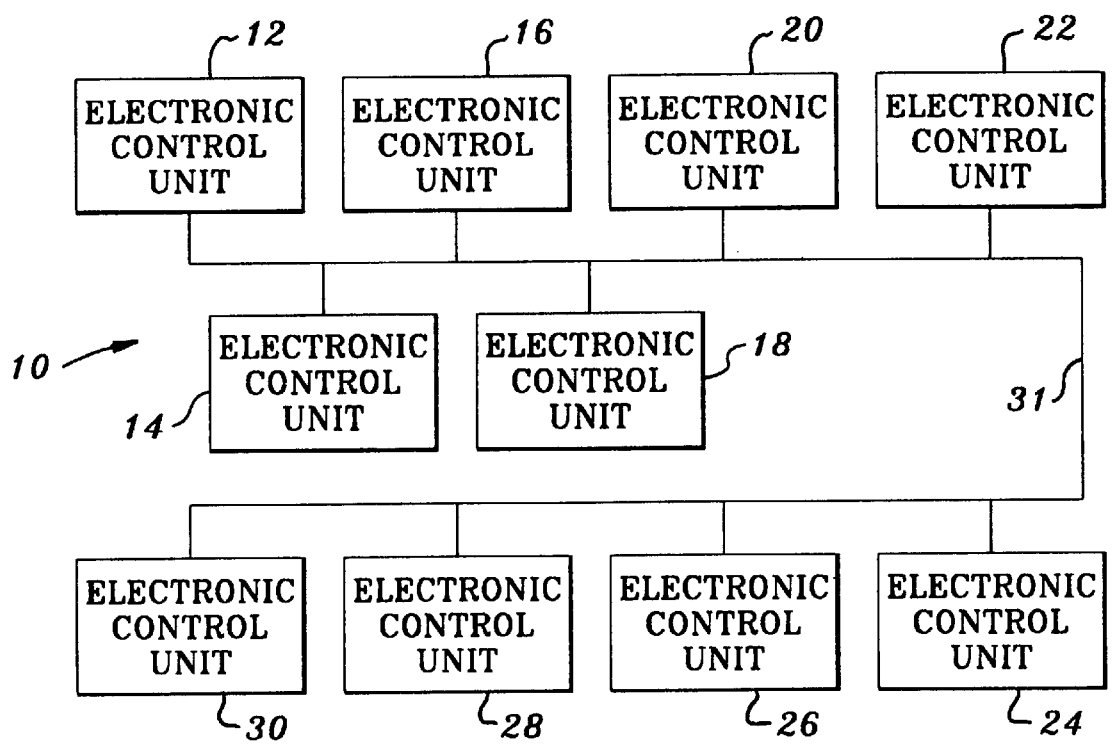
FIG. 1 is a simplified schematic block diagram of a vehicle network with a plurality of ECUs.

Referring to FIG. 1, a vehicle CAN network 10 includes a plurality of ECUs 12–30 (ten are shown, but the present invention can be used in connection with more or fewer ECUs) interconnected via a CAN bus 31.

Referring to FIG. 2, the bus 31 carries message traffic, which, for example, with respect to a particular ECU, will be comprised of relevant messages M12, M27 and M89 (shaded) and irrelevant messages M73, M43, M15, M96, M87, M78 and M10 (unshaded). Each message includes an identifier portion and a data portion. As these network messages are periodically transmitted by other ECUs and received by an ECU, they are processed as follows: A network hardware interface 32 on the ECU detects a message, and initiates an ISR 34, which suspends other software processing.

The ISR 34 is extremely time critical in nature, since it suspends all other lower priority activity in the ECU. According to the present invention, an acceptance filter algorithm computes a hash value from a hash key, a portion of the, 29 bit message identifier. The computation of the hash value is described by the following psuedo code:

Mask out the priority and the "other" reserved bits from the Identifier,
Mask out the SA,
If it is a J1939 Proprietary message, then we will automatically combine the Byte 1 value in place of the SA and then perform the hash function.
(Identifier: Byte 1) mod HashPrime, or as the pseudo code shows:
int FoundInHash(void)
{
if (msg.Identifer==ProprietaryMessage)
    return (HashTable[(msg.Identifier+Byte 1) % HashPrime]);
else
    return (HashTable[msg.ldentifier % HashPrime]);
}

The hash value is compared to a corresponding set of index values of a hash table or lookup table 36, each index value having a corresponding relevance value, REL, 0 if not relevant, 1 if relevant. Preferably, the hash value can range from 0 to N, where N is preferably a prime number which represents the number of index values in the lookup table. A properly designed hash function and lookup table, with a proper value for N, reduces the number of irrelevant messages to nearly zero. Messages that pass the test (with a REL value of 1) are moved to a RAM buffer 38, typically configured as a First-In-First-Out (FIFO) buffer. Messages of no relevance (REL value of 0) are discarded by the particular ECU performing this method.

At a more convenient and not quite so critical time, a message processing service routine 40 far fewer messages for additional processing. The message processing service routine 40 compares the message identifiers (M12, M27, etc) to a stored list 42 of Valued Messages. If the new message appears in the list 42, the routine 40 will continue to decode and extract data from the message at 44. If the routine 40 determines that the new message does not appear in the list 42, it will discard the message. The routine 40 may then either exit, or it may begin again by looking at the next message in the buffer 38.

With this method, the ISR does a variable amount of work requiring approximately 60 microseconds of CPU time if the message is accepted, but only around 25 to 30 microseconds of CPU time if the message is rejected. The message processor routine 40, scans the list 42 of valued messages, requiring approximately 100 microseconds of CPU time to exhaustively search the list. The messages that are processed are predominately messages with value to this node. Proper selection of the hash filter will reduce the messages of no interest to nearly zero. As the length of the list is increased, the time to scan the list is increased.

If a message is found in the list 42, the message is then decoded. In a typical system approximately 80% of the messages will be not relevant to this particular ECU, and a large percentage of them will be rejected by the ISR 34, thus saving a significant amount of CPU processing time, which can then be used to perform other functions.

Still referring to FIG. 2, and more specifically to the hash table 36, the hash table 36 allows all identifiers of interest to be processed by the system while rejecting nearly all identifiers that are not of interest. The overall performance improvement as a result of this invention is dominated by the quality of the hash table 36 that is used. A very large hash table, one composed of $2^{29th}$ entries, will allow rejection of all identifiers that are not relevant to a given ECU. However, since memory of that size is not economical, a more typical hash table may be sized between about 256 and 2048 entries.

As the size of the hash table is reduced (smaller than $2^{29th}$ entries), some percentage of identifiers for a given hash divisor function will compute to the same hash index value. Messages with this characteristic have the same relevancy value, and if any one of these messages is relevant, all are therefore identified as relevant by the ISR 34. Those that indeed are not relevant will be processed anyway and rejected by message processing service routine 40 when no matching identifier is found in list 42. Therefore, selecting an appropriately sized hash table and an appropriate hash divisor will result in a system that retains all messages of interest and rejects a very high percentage of messages of no interest. The hash divisor is determined empirically by an iterative process involving a modulus divide operation on the identifier which produces index values for the hash table. For example, a hash divisor of 251 will produce a hash table with 251 unique index values.

Generation of a good hash table and hash divisor requires analysis on the set of messages present on the system. It is important to recognize that for a given period of time (a sample interval), I messages on the network will exist that are relevant to the chosen ECU, and T messages will be the total messages on the network. There will exist some set of message—J— that the ECU processes which are not relevant. Using these sets of messages, it is possible to iterate through various candidate hash divisors to determine the quality of the candidate solution. A good solution will produce the smallest J term. A 60-second sample is generally a good sample interval over which to compute this information.

An appropriate hash table can be generated as follows:
a. List all messages that the chosen ECU needs to receive.
b. For each message, list the identifier and the nominal repetition rate of this message.
c. Compute the occurrence count for this message over a sample period (60 seconds). If the message is not normally broadcast, this may compute to zero. If this is the case, then set the occurrence count to 1. This list represents the set of messages identified as X.
d. Create another list of all remaining messages which the chosen ECU does not need to receive. Again compute the occurrence count as shown above. This list represents the set of message identified as Y.
e. Produce the set of messages, Z, by combining sets X and Y. (This is the set of all messages which could appear on the network in this sample period.)

The iterative computation proceeds as follows:
a. For each candidate hash divisor
b. Create a hash table of size corresponding to the hash divisor value, and initialize all entries to value 0
c. Compute the hash index for each identifier in set X. Mark this entry in the table with a 1 to signal that any identifiers that compute this hash index will be received.
d. When all messages in the set X have been processed, the hash table is fully constructed.

To evaluate the quality of this table, process the sets X and Z as follows:
a. Initialize to zero a counter for the messages of interest—I
b. Initialize to zero a counter for the messages that pass the hash filter but are not wanted—J
c. Initialize to zero a counter for the total messages on the network—T
d. For each identifier in set X,
   Add the occurrence count into I
   Add the occurrence count into T
e. For each identifier in set Y
   Compute the hash, look up the relevancy value and if the relevancy value is not zero (message passes the filter), add the occurrence count into J
   Add the occurrence count into T
I+J now indicates the total messages received, and J/(I+J) as a percentage indicates the amount of network "noise"—unnecessary processing as a result of those that pass the filter.

This can also be expressed as a percentage of the total messages with J/T.

Repeat this process for the next candidate hash divisor, and, after the process has been performed for all proposed hash divisors, select the hash divisor and therefore the hash table that rejects the largest number of non-relevant messages.

Figure 3:
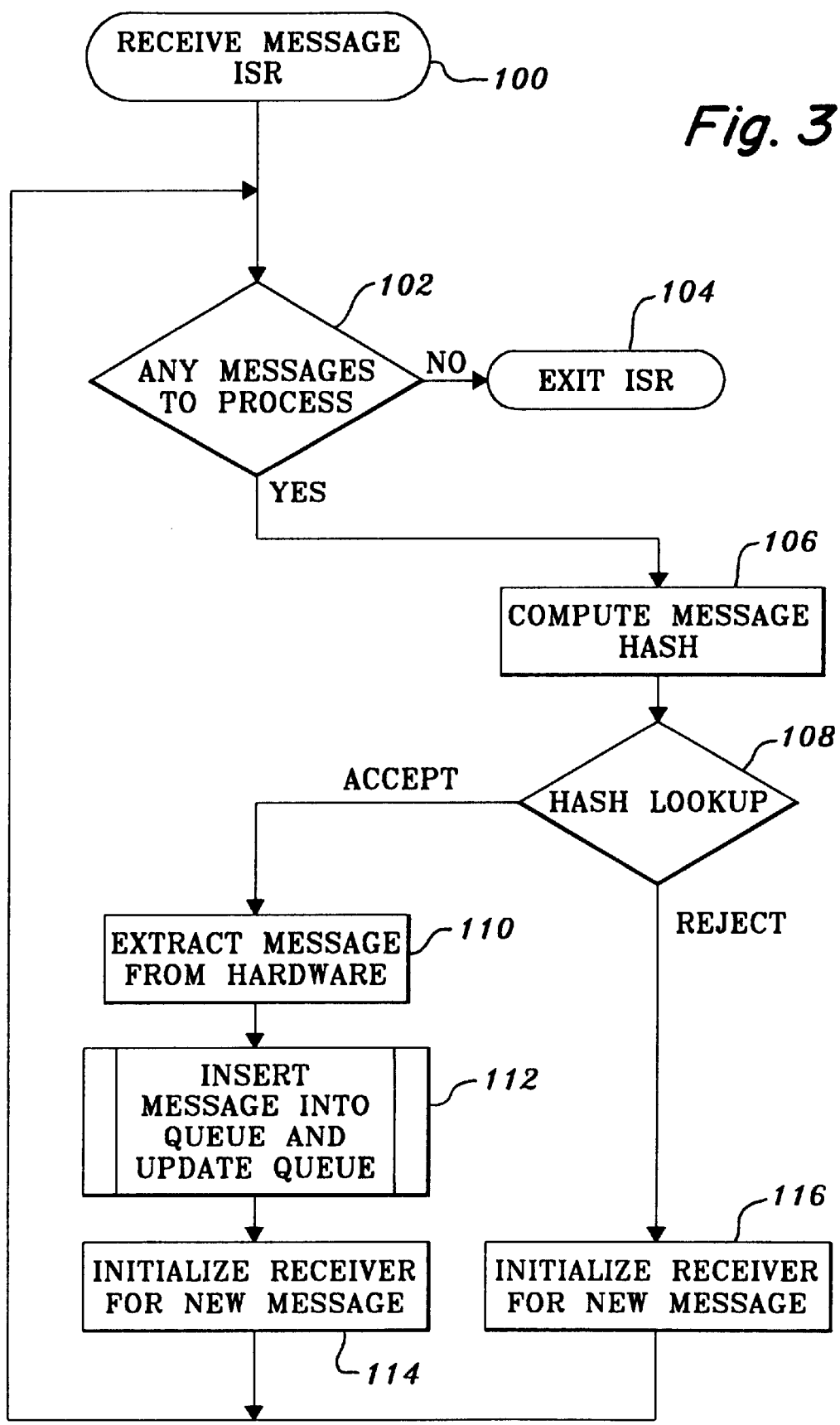
FIG. 3 is logic flow diagram illustrating the message receiving or filtering portion of the present invention.

Referring to FIG. 3, the ISR routine begins at step 100. Step 102 determines whether or not there are any messages to process. If not, the routine exits at 104. If yes, step 106 computes a hash value. In step 108 the hash value is compared to the index value in the lookup table 36. If the lookup table 36 indicates that the message is not relevant, step 116 initializes for receipt of a new message and the routine returns to step 102.

If the lookup table 36 indicates that the message is relevant, step 110 extracts the message from the bus 31 and step 112 inserts the message into a queue (in buffer 38) and updates the queue. Step 114 then initializes for receipt of a new message and the routine returns to step 102.

Figure 4:
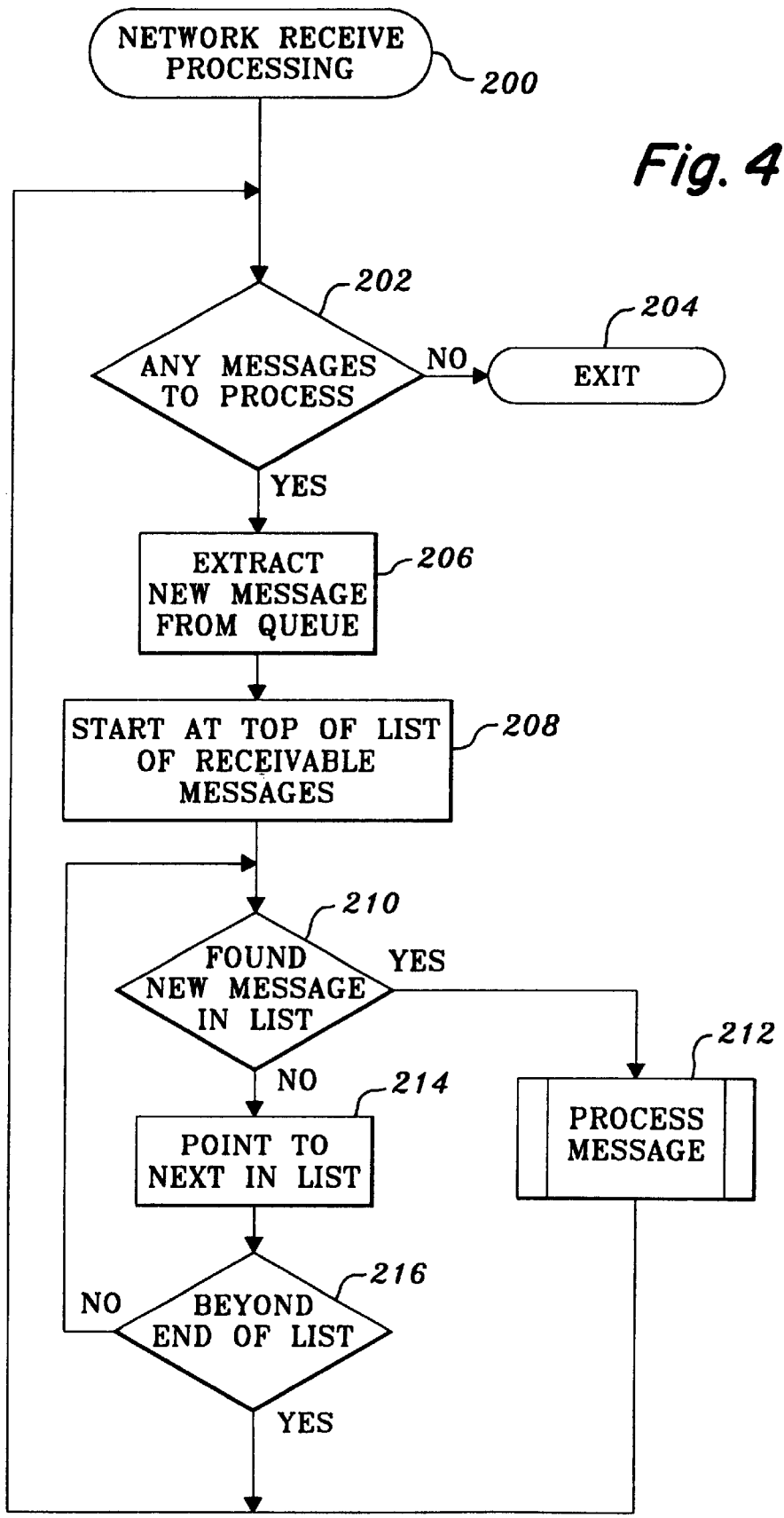
FIG. 4 is logic flow diagram illustrating the message processing portion of the present invention.

Referring to FIG. 4, the message processing routine 40 begins at step 200. Step 202 determines whether or not there are any messages to process. If not, the routine exits at 204. If yes, step 206 extracts the message from the queue (in buffer 38). In step 208 a list index value is set to represent the first value in the stored list 42 of identifiers. Then, in step 210, if the identifier of the extracted message matches the first value in the stored list 42, then the message is processed normally in step 212. If the identifier of the extracted message does not match the first value in the stored list 42, then step 214 increments the list index value so that it represents the next value in the list 42. Then, if the list index value is beyond the last item in the list 42, step 216 returns the routine to step 202. Otherwise, step 216 returns the routine to step 210 to determine if the identifier of the extracted message matches the next value in the stored list 42.

The ISR 34 is the time critical routine and preferably performs as little processing as possible. If the ISR 34 inserts a message into the Queue, then the message processing routine 40 will process the messages in the queue.

The following is the program source code (psuedo code) for the routines of FIGS. 3 and 4.

```
// Time Critical Portion
void CAN_InterruptServiceRoutine(void)
{
    while (MsgReady ( )) // While 1 or more messages are
        waiting in the hardware to be serviced
    {
        if (FoundInHash ( )) // If this message passes the hash
            lookup then
            MsgEnqueue ( ); // Insert it into a FIFO for lower
                priority processing
    }
}
// Lower Priority Process to be executed often to service the
    messages queued in the FIFO void CAN_
    MessageProcessor(void)
{
    while (MsgDequeue ( )) // While there are messages in the
        FIFO
    {
        for (x=0; x<sizeof(ValidMessages)/sizeof
            (ValidMessages[0]); x++) // Scan the table for a
            match
        {
            if (msg.ldentifier==ValidMessages[x].Identifier) //
                Found a match
            {
                ProcessData ( ); // Appropriate function to pro-
                    cess this data as needed
                Break; // Done with the search for this Identifier
            }
        }
    }
} int FoundInFlash(void)
{
    if (msg.Identifer==PropritaryMessage)
        return (HashTable[(msg.Identifier+Byte 1) %
            HashPrime]);
    else
        return (HashTable[msg.Identifier % HashPrime]);
}
const char HashTable[N] =
{
    0, // Index 0: No identifiers of interest hash to this index
    0, // Index 1: No identifiers of interest hash to this index
    1, // Index 2: One or more identifiers that we want hash
        to this index
    1, // Index 3: One or more identifiers that we want hash
        to this index
    0, // Index 4: No identifiers of interest hash to this index
    1, // Index 5: One or more identifiers that we want hash
        to this index
    . . .
    0// Index N-1: No identifiers of interest hash to this index
};
const ValidMessageTable_S ValidMessages[ ] =
{
    // Identifier, . . . represents other information as needed for
        processing this Identifier
    16699122, . . . ,
    15729699, . . . ,
    10702923, . . . ,
    15395459, . . . ,
    . . .
}
```

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In a network having a plurality of electronic control units (ECU) connected with each other via a bus, a message processing method performed by an ECU of the network, each message having an identifier portion and a data portion, the method comprising:

converting the message identifier to a hash value;

comparing the hash value to a plurality of index values stored in a lookup table, the lookup table having relevance values corresponding to each index value;

discarding the message if a corresponding relevance value indicates that the message is not relevant to the ECU;

inserting the message into memory buffer if a corresponding relevance value indicates that the message is relevant to the ECU; and further processing only selected ones of the messages in the buffer.

2. The method of claim 1, wherein:

the hash value has fewer data bits than that of the identifier portion of the messages.

3. The method of claim 1, wherein:

a number of unique hash values is the same as a number of index values.

4. The method of claim 1, wherein:

a number, N, of index values for the lookup table is determined by selecting from a plurality of potential values for N, a particular N value which minimizes a number of non-relevant messages received by the ECU.

5. In a network having a plurality of electronic control units (ECU) connected with each other via a bus, a message processing method performed by an ECU of the network, each message having an identifier portion and a data portion, the method comprising:

converting the message identifier to a hash value, the hash value having fewer data bits than that of the identifier portion of the messages;

comparing the hash value to a plurality of index values stored in a lookup table, the lookup table having relevance values corresponding to each index value;

discarding the message if a corresponding relevance value indicates that the message is not relevant to the ECU;

inserting the message into memory buffer if a corresponding relevance value indicates that the message is relevant to the ECU; and further processing only selected ones of the messages in the buffer.

6. The method of claim 5, wherein:

a number of unique hash values is the same as a number of index values.

7. In a network having a plurality of electronic control units (ECU) connected with each other via a bus, a message processing method performed by an ECU of the network, each message having an identifier portion and a data portion, the method comprising:

converting the message identifier to a hash value;

comparing the hash value to a plurality of index values stored in a lookup table, the lookup table having relevance values corresponding to each index value, the lookup table having a number of index values which is the same as the number of unique hash values;

discarding the message if a corresponding relevance value indicates that the message is not relevant to the ECU;

inserting the message into memory buffer if a corresponding relevance value indicates that the message is relevant to the ECU; and further processing only selected ones of the messages in the buffer.

8. The method of claim 7, wherein:

the hash value has fewer data bits than that of the identifier portion of the messages.

* * * * *